(12) United States Patent
Ogusu

(10) Patent No.: US 6,562,253 B1
(45) Date of Patent: May 13, 2003

(54) METHOD OF PRODUCING AN OPTICAL ELEMENT HAVING A MULTIPLE-LEVEL STEP-LIKE STRUCTURE THROUGH LITHOGRAPHY

(75) Inventor: Makoto Ogusu, Tochigi-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/628,695

(22) Filed: Jul. 28, 2000

(30) Foreign Application Priority Data

Jul. 30, 1999 (JP) .......................................... 11-217807

(51) Int. Cl.⁷ .............................................. B29D 11/00
(52) U.S. Cl. ............................ 216/24; 216/22; 216/26; 216/12; 219/121; 430/5; 430/30; 430/32
(58) Field of Search ............................ 65/60.3; 216/12, 216/24, 26, 14, 22; 219/121; 350/162.2; 359/571, 565; 369/116; 430/5, 30, 32

(56) References Cited

U.S. PATENT DOCUMENTS 4,895,790 A * 1/1990 Swanson et al. ............ 430/321
5,623,473 A * 4/1997 Ichihara ...................... 369/116

* cited by examiner

Primary Examiner—Randy Gulakowski
Assistant Examiner—Gentle E. Winter
(74) Attorney, Agent, or Firm—Fitzpatrick, Cella, Harper & Scinto

(57) ABSTRACT

A method of producing an optical element having a multiple-level step-like structure includes a first process for providing a first mask pattern at a position corresponding to a predetermined boundary among boundaries at steps of the multiple-level step-like structure of a substrate, the first mask pattern having a width narrower than that of a single step, a second process for providing a second mask pattern upon the substrate having the first mask pattern formed thereon, the second mask pattern having a width corresponding to a single step or plural steps of the multiple-level step-like structure and a third process for processing the substrate by use of the first and second mask patterns and thereafter for removing the second mask pattern while leaving the first mask pattern there. After repeating the second and third processes plural times of a predetermined number, the first mask pattern is removed.

6 Claims, 9 Drawing Sheets

FIG. 13A
PRIOR ART

| 0  | 61 | 0  | 0  |
|----|----|----|----|
| 0  | 0  | 61 | 61 |
| 61 | 61 | 0  | 0  |
| 0  | 0  | 0  | 61 |

FIG. 13B
PRIOR ART

| 122 | 183 | 122 | 0   |
|-----|-----|-----|-----|
| 0   | 122 | 61  | 183 |
| 183 | 61  | 122 | 0   |
| 0   | 122 | 0   | 183 |

FIG. 13C
PRIOR ART

| 122 | 183 | 122 | 0   |
|-----|-----|-----|-----|
| 244 | 366 | 305 | 427 |
| 427 | 61  | 122 | 244 |
| 0   | 122 | 244 | 183 |

→ E
→ e

METHOD OF PRODUCING AN OPTICAL ELEMENT HAVING A MULTIPLE-LEVEL STEP-LIKE STRUCTURE THROUGH LITHOGRAPHY

FIELD OF THE INVENTION AND RELATED ART

This invention relates to a method of producing an optical element which may suitably be used as, for example, an optical component of a semiconductor manufacturing reduction projection exposure apparatus, such as a phase modulation plate or an optical element having a two-dimensional binary structure or a phase type CGH (Computer Generated Hologram), or an optical interconnection element.

FIG. 9A is a fragmentary sectional view of a Fresnel lens 1, which comprises a Fresnel type diffraction grating. It has a saw-tooth blazed shape 2. FIG. 9B is a fragmentary sectional view of a binary optics element 3, which comprises a binary type diffraction grating. It has a step-like shape 4.

An idealistic diffractive optical element may be one having a blazed shape 2 such as shown in FIG. 9A, and it may assure a diffraction grating of 100% with respect to a design wavelength. However, it is very difficult to produce a complete blazed shape 2. Therefore, while quantizing and approximating the blazed shape 2, the binary optics element 3 having a step-like shape 4 such as shown in FIG. 9B is used. Although the binary optics element 3 is made on the basis of approximation of the Fresnel lens 1, a diffraction efficiency for first-order diffraction light can be 90% or more. In consideration of this, much research has been done with respect to such binary optics 3, by approximating a blazed shape 2 with a step-like shape.

In order that such an optical element has an enlarged power and that, through much better approximation, the optical element has an improved performance as a diffractive optical element, the processed linewidth should be made to be very fine, as much as possible. To this end, a lithographic process having been developed in the semiconductor manufacturing technology and being able to accomplish very high precision processing has been used.

FIG. 10 is a schematic view which illustrates the procedure for making a diffractive optical element having an eight-level step structure. More specifically, in (a) of FIG. 10, drops of a resist material are applied to a cleaned substrate 11 and, through spin coating, a resist coating of a film thickness of about 1 micron is formed on the substrate. Then, through a baking process, a resist film 12a is produced. In (b) of FIG. 10, the substrate 11 is loaded into an exposure apparatus having a performance with which a finest diffraction pattern can be printed. Then, a reticle 13a corresponding to a desired diffraction pattern is used as a mask, and exposure light L, with respect to which the resist film 12a has a sensitivity, is projected thereto. When a positive type resist is used, zones having been exposed with the exposure light L become solvable by a developing liquid. Thus, in (c) of FIG. 10, a resist pattern 14a having a desired size can be produced. Subsequently, in (d) of FIG. 10, the substrate 11 is introduced into an ion beam etching apparatus or a reactive ion etching apparatus by which an anisotropic etching process can be done. While using the produced resist pattern 14a as an etching mask, the substrate 11 is etched for a predetermined time period, by which it is etched to a predetermined depth. Then, the resist pattern 14a is removed. By this, a pattern 15a having a two-level step structure such as shown in (e) of FIG. 10 is produced.

Again, as in (a) of FIG. 10, a resist film 12b is produced on the substrate 11 having the pattern 15a formed thereon. In (f) of FIG. 10, the substrate then is placed in the exposure apparatus, and an exposure process is performed while a reticle 13b formed with a pattern having a periodicity two times larger than that of the reticle 13a is used as a mask. The mask pattern is transferred onto the pattern 15a, after the two are aligned with each other at the alignment precision of the exposure apparatus. By a developing process in (g) of FIG. 10, the resist film 12b is developed such that a resist patten 14b is produced. Then, in (h) of FIG. 10, as in (d) of FIG. 10, a dry etching process is performed to remove the resist pattern 14b, by which a pattern 15b having a four-level step structure is produced.

Subsequently, in (i) of FIG. 10, as in (a) of FIG. 10, again a resist film 12c is applied to the substrate 11. Then, an exposure process is performed while a reticle 13c formed with a pattern having a periodicity four times larger than that of the reticle 13a is used as a mask. Then, in (j) of FIG. 10, the resist film 12c is developed, by which a resist pattern 14c is produced. Finally, in (k) of FIG. 10, the resist pattern 14c is removed, whereby a diffractive optical element with a pattern 15c having an eight-level step-like shape is produced.

When a diffractive optical element having a multiple-level step-like shape is to be produced while reticles having periodicities in multiples are used as masks, such as described above, as long as no alignment error or no dimensional error occurs, a multiple-level step structure having an idealistic shape can be produced. For example, by using three reticles 21a–21c shown in FIG. 11, an eight-level structure "A" having an idealistic step height "d" can be produced.

A paper in "O plus E", No. 11, pages 95–100 (1996), discusses a procedure wherein processes of resist application, mask pattern and etching are repeated, and it mentions that a multiple-level phase type CGH (Computer Generated Hologram) having phase levels of $2^L$ can be produced where L is the number of masks used.

FIGS. 12a–12c are plan views for explaining a procedure for producing a CGH. More specifically, FIGS. 12a–12c show patterns of reticles 31a, 31b and 31c, wherein zones depicted with hatching are light blocking portions. For example, the reticle 31a is used to perform the etching to a depth of 61 nm, the reticle 31b is used to perform the etching to a depth of 122 nm, and the reticle 31c is used to perform the etching to a depth of 244 nm. Although the order of using these reticles 31a–31c is not fixed, a better resist patterning precision is attainable when a reticle for a smaller etching depth is used first.

The reticle 31a is used first to perform resist patterning on a substrate, and it is etched to a depth of 61 nm. As a result, an etching depth distribution such as shown in FIG. 13A is produced, wherein numerals denote etching depths (nm). Thereafter, the resist on the substrate is removed. Then, the reticle 31b is used to perform resist patterning, and the substrate is etched to a depth of 122 nm, by which an etching depth distribution such as shown in FIG. 13B is produced. Further, the resist on the substrate is removed, and the reticle 31c is used to perform resist patterning. The substrate is etched to a depth of 244 nm, by which an etching depth distribution such as shown in FIG. 13C is produced. FIG. 14 is a sectional view taken along a line E–e in FIG. 13C.

In the examples described above, if an alignment error occurs in registration of reticles, it directly leads to degradation of the performance of a diffractive optical element.

More specifically, at the boundary of zones where phase differences are quantized, a very small structure which is not included in the design may be produced due to the alignment error. Such a very small structure causes degradation of the function of the diffractive optical element, and thus, causes a decrease of the diffraction efficiency. Further, the light corresponding to the decrease of diffraction efficiency advances in a direction not intended in the design as unwanted diffraction light, and it causes various undesirable problems. In this manner, light rays not desired may be produced from the diffractive optical element. Such light rays may function as flare light in an optical system wherein the diffractive optical element is used, and the flare light causes degradation of the imaging performance of the optical system.

FIG. 15 shows an example. If an alignment error occurs in the registration of reticles 21a–21c of FIG. 15 and it causes deviations r1 and r2 as illustrated, a produced diffractive optical element has a shape "B" different from the idealistic shape "A" of FIG. 11. Particularly, very small structures being smaller than the wavelength and produced at the deviated portions of the reticles may cause various problems such as increased scattered light or trapping of light which may result in a temperature rise of the optical element, for example.

SUMMARY OF THE INVENTION

It is an object of the present invention to provide a method of producing a diffractive optical element by which a required shape can be formed very accurately.

In accordance with an aspect of the present invention, there is provided a method of producing an optical element, including a process for forming a quantized level distribution on a substrate through lithographic technology, characterized in that, in a portion of the substrate about a boundary between unit zones, in each of which a minimum unit of the level distribution is to be defined, a mask having a width including the boundary and being smaller than the width of the unit zone is provided. This enables that, while the portion about the boundary is kept as an unprocessed region, the remaining portion of the substrate is processed, by which the quantized level distribution is produced on the substrate.

In accordance with another aspect of the present invention, there is provided a method of producing an optical element, including a process for forming a quantized level distribution on a substrate through lithographic technology, characterized in that, in a portion of the substrate about a boundary between unit zones, in each of which a minimum unit of the level distribution is to be defined, a mask having a width including the boundary and being smaller than the width of the unit zone is formed. This enables that, while the portion about the boundary is kept as an unprocessed region, the remaining portion of the substrate is etched, by which the quantized level distribution is produced on the substrate, and that, after the level distribution is produced, the unprocessed portion is removed.

In these aspects of the present invention, the quantized level distribution may have a function as a diffraction grating.

The mask may be provided so that a position of an edge of the mask is registered with the boundary.

The mask may be provided by a lithographic process using an electron beam.

The mask may be provided by a lithographic process using a phase shift mask.

The unprocessed region may have a width not less than an alignment precision of a lithographic apparatus to be used for the production.

The mask may comprise a light blocking film having an etching rate smaller than that of the substrate.

The light blocking film may be substantially made of one of Cr, Al, Ti, Ni, Mo and W.

The surface of the light blocking film may have an anti-reflection function with respect to a wavelength to be used.

The light blocking film may comprise a $CrO_2$ film.

The mask may be made of a light transmissive material having an etching rate smaller than that of the substrate.

The light transmissive material may be substantially made of one of $TiO_2$ and indium tin oxide (ITO).

The unprocessed region may be defined only in a portion of boundaries providing different phase differences.

A portion of the unprocessed region may have a central position being registered with the boundary position of the quantized zones.

At a boundary where a phase difference of zones across that boundary corresponds to a unit period of a design wavelength of the optical element, the unprocessed region may be defined to be included in a region of the substrate which is juxtaposed to the unprocessed region and which is not processed, such that the position of the boundary may be registered with an edge position of the unprocessed region.

The unprocessed region may be defined to be included in one of the adjacent zones in which the amount of processing of the substrate is smaller than the other, and the position of the boundary may be registered with the position of an edge of the unprocessed region.

The removal of the unprocessed region may include an isotropic etching process.

The substrate may be made of fluorite, and the isotropic etching process may comprise a wet etching process using water or a nitric acid.

The substrate may be made of quartz, and the isotropic etching process may comprise a wet etching process using water or a hydrofluoric acid.

The substrate may be made of one of quartz and fluorite.

In accordance with a further aspect of the present invention, there is provided an optical element produced in accordance with a procedure as discussed above.

The optical element may be a computer generated hologram.

These and other objects, features and advantages of the present will become more apparent upon a consideration of the following description of the preferred embodiments of the present invention taken in conjunction with the accompanying drawings.

BRIEF DESCRIPTION OF THE DRAWINGS

FIGS. 13A–13C are schematic views for explaining etching depths.

DESCRIPTION OF THE PREFERRED EMBODIMENTS

Figure 1:
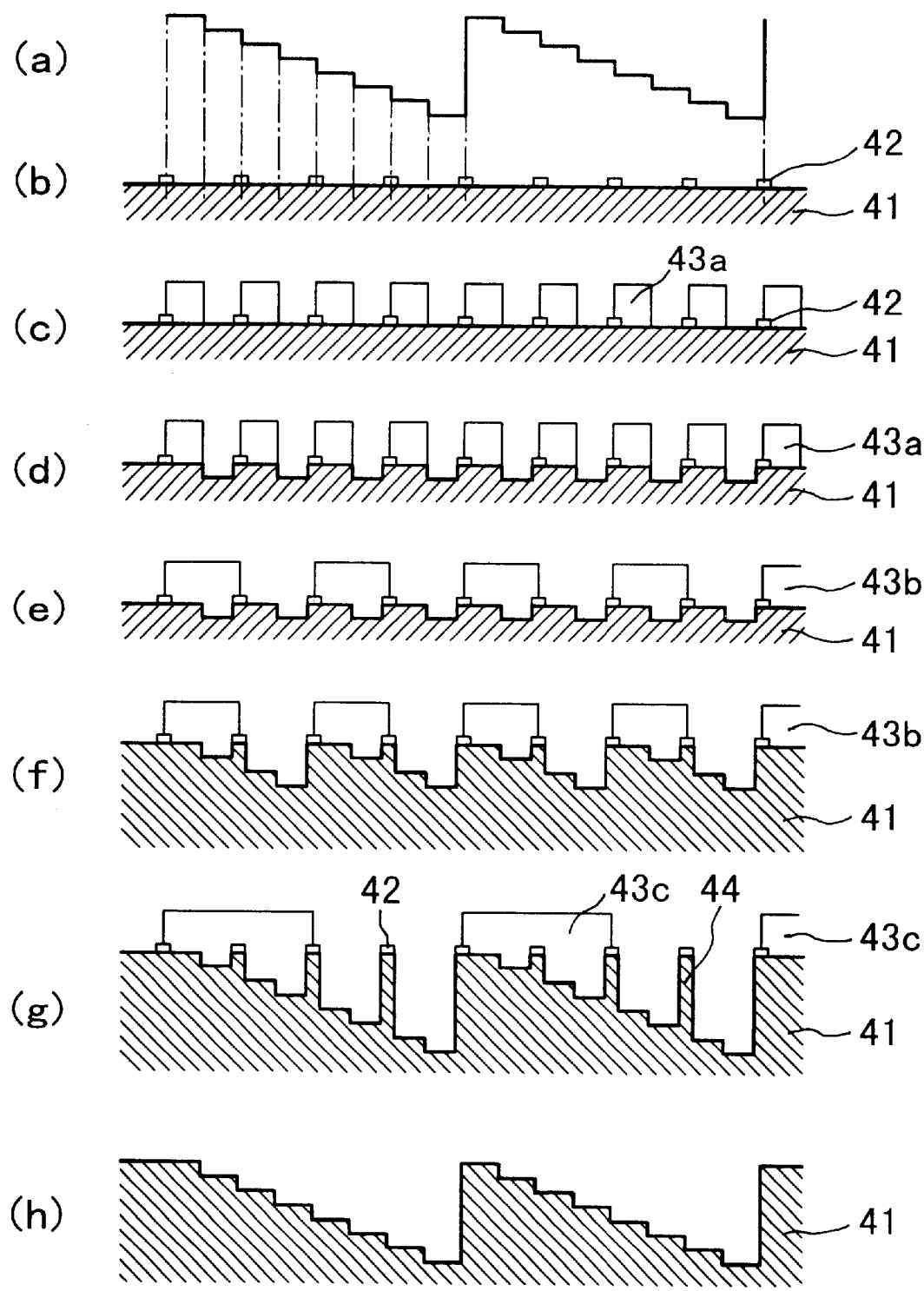
FIGS. 1((a)–(h)) is a schematic view for explaining processes for producing a diffractive optical element in accordance with a first embodiment of the present invention.

FIG. 1 is a schematic view for explaining processes for producing a binary optics element in accordance with a first embodiment of the present invention. FIG. 1 in (a) shows the sectional shape of an eight-level optical element to be produced. In this embodiment, as shown in FIG. 1 in (b), first a Cr film 42 on a quartz substrate 41 is patterned by using an electron beam so that unprocessed regions are defined at positions where boundaries of three masks (reticles) such as described hereinbefore are superposed. The unprocessed region is a region in which a film formed thereon by the patterning will not be removed by etching, and also the unprocessed region is a region which does not function as a diffractive optical element. Thus, use of a light blocking film therefor is suitable. The Cr film 42 may not have a complete etching proof. It may be etched to some extent unless the etching action extends to the substrate 41 underlying it. Namely, the film may be one having a thickness by which, even though the film is etched together with processing regions of the substrate during the etching process, the surface of the substrate 41 underlying the film is not exposed finally.

Since the Cr film 42 does not function as a schematic view, the area thereof should desirably be made as small as possible. The smallest linewidth thereof may be determined in accordance with the alignment precision of the exposure apparatus used for the patterning.

As shown in FIG. 1 in (c), one of the three masks having a finest pattern is used to form a resist pattern 43a. Subsequently, as shown in FIG. 1 in (d), the quartz substrate 41 is etched to a desired depth, while using the resist pattern 43a and the Cr film 42 as an etching mask. Here, the edge of each step of the substrate 41, which is registered with the mask edge, is in registration with a corresponding edge of the Cr film 42, as illustrated.

Subsequently, as shown in FIG. 1 in (e), the resist pattern 43a is removed, and then, while using a second mask having a slightly wider linewidth pattern, a resist pattern 43b is patterned in a similar manner as shown in FIG. 1 in (c). Here, since edges of this mark are registered with those of the first mask used first, all the edges of the resist pattern 43b are formed on the Cr film 42. Then, as shown in FIG. 1 in (f), the substrate 41 is etched to a desired depth while using the resist pattern 43b and the Cr film 42 as an etching mask. Here, the edge of each step of the substrate 41, after the etching process, is in registration with a corresponding edge of the Cr film 42, as illustrated.

Subsequently, as shown in FIG. 1 in (g), the resist pattern 43b is removed, and then, while using a third mask having a relatively most coarse pattern, a resist pattern 43c is patterned. By a subsequent etching process, a shape having protrusions 44 is produced.

As shown in FIG. 1 in (h), the resist pattern 43c and the Cr film 42 are then removed through separate processes, and finally, the protrusions 44 are removed by a wet etching process using a hydrofluoric acid. Since the wet etching process shows an isotropic property, protrusions 44 having a column structure can be removed simultaneously, regardless of the height thereof. Thus, when quartz having a good transmission factor with respect to a broad wavelength region is used, a wet etching process using hydrofluoric acid is suitable.

Figure 2:
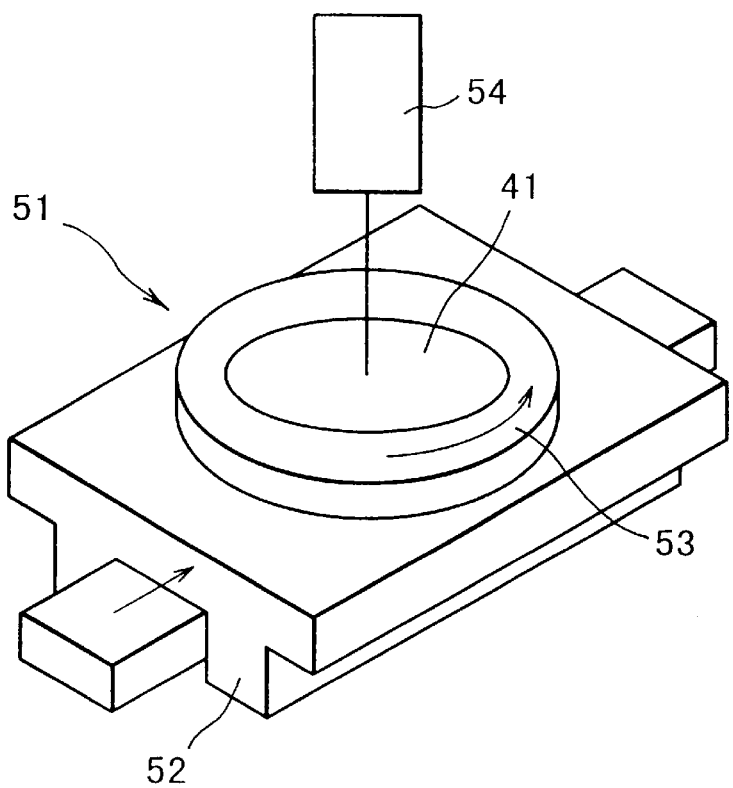
FIG. 2 is a schematic view of a semiconductor exposure apparatus.

FIG. 2 is a schematic view of a semiconductor exposure apparatus which can be used for the patterning of the Cr film 42 upon the substrate 41 as described above. The exposure apparatus 51 comprises a single-axis horizontal motion unit 52, a rotational driving unit 53 and an electron beam projecting unit 54.

Figure 3:
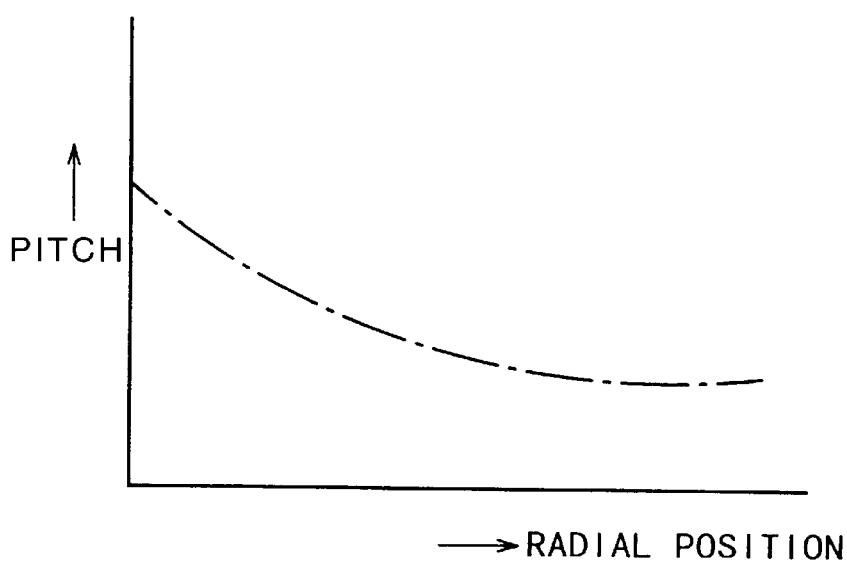
FIG. 3 is a graph for explaining the relation between a radial position and a pitch.

FIG. 3 shows the relation between a radius position and a pitch, in the production of a diffractive optical element having a function as a convex lens. The radius position for forming the Cr film 42 can be determined from the design value which is the function of the radius as such.

The horizontal motion unit 52 stops as the electron beam irradiation position reaches a radius position to be exposed. Then, the electron beam projection unit 54 starts projection of an electron beam and, simultaneously therewith, the rotary driving unit 53 rotationally moves the substrate 41.

The position where the Cr film 42 is to be formed is limited to the position where the boundaries of plural masks are to be registered in design, for formation of the resist pattern. Similarly, it may be limited to a position where the number of times of mask superposition is large, or it may be limited to such a region which should be etched to a large depth, although the number of times of superposition is the same.

The edge of the Cr film 42 at the boundary of its pitch should desirably be placed in registration with the design pitch boundary. The Cr film 42 within the pitch should preferably be disposed while taking the masking edge designed at the center. Here, the Cr film 42 at the pitch boundary should be included in a region wherein the substrate 41 is not to be etched. If it is included in a region to be etched, the design of the mask pattern edge should be made in consideration of the unprocessed region. Further, the pattern edge of the mask pattern may be designed to be the center of the Cr film 42 as an offset is applied thereto.

In this embodiment, a semiconductor exposure apparatus is used as a patterning apparatus. Since a general alignment precision of such a semiconductor exposure apparatus is very good when it is on the order of 100 nm or less, the unprocessed region of the pattern may be designed to keep a process selectivity among the material to be used for the patterning, the material for forming the unprocessed region, and the material for the diffractive optical element. Thus, the materials are not limited to those used in this embodiment. Further, while in this embodiment, the patterning process starts with a mask having a finest mask, the order of the masks to be used is not very influential to the result and, therefore, the masks may be used in a reverse order or at random.

Figure 4:
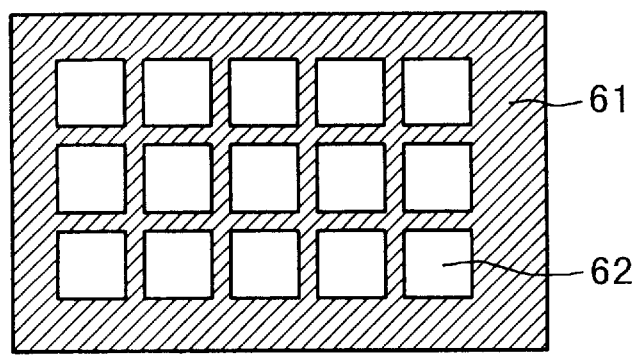
FIG. 4 is a schematic plan view of a substrate in a second embodiment of the present invention.
Figure 5:
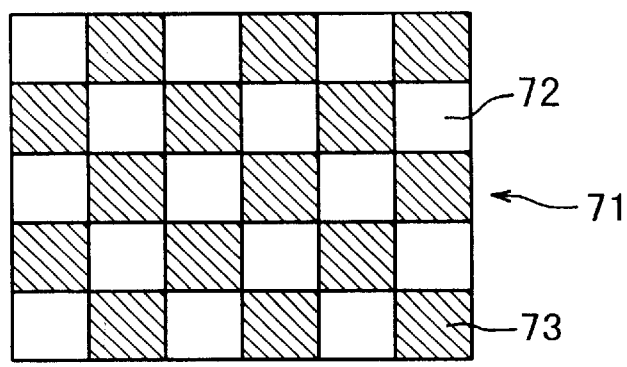
FIG. 5 is a schematic plan view of a phase shift mask.

FIGS. 4–8 show a second embodiment, wherein FIG. 4 is a plan view of a quartz substrate. The substrate has formed thereon a Cr film 61 having a width of about 0.1 micron and zones 62 of a few microns square. In this embodiment, as in the preceding embodiment, a semiconductor exposure apparatus is used as a patterning apparatus. The unexposed region of the pattern is designed with a width of 100 nm. As regards the formation of the Cr film 61, an electron beam may be used as in the first embodiment. However, in this embodiment, for more efficient operation, a phase shift mask 71 such as shown in FIG. 5, for example, is used to perform the patterning. In the phase shift mask 71, there are higher regions 72 and lower regions 73 alternately defined to provide phase differences, whereby a check-like pattern is produced. Here, the width of the Cr film 61 can be adjusted by controlling the exposure amount.

Figure 6:
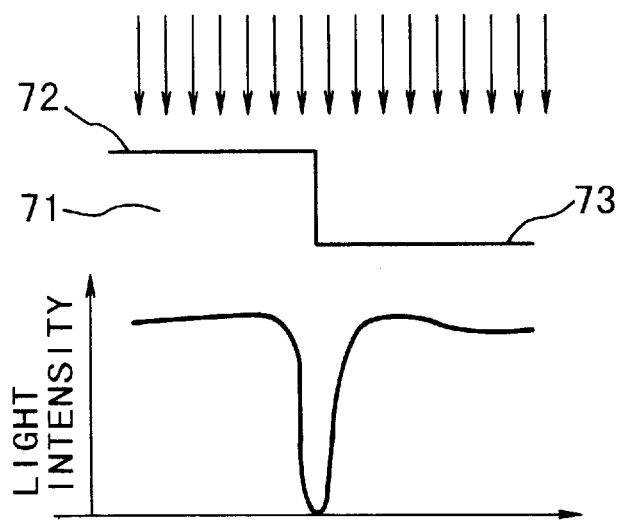
FIG. 6 is a graph for explaining a light intensity distribution to be provided by a phase shift mask.

As shown in FIG. 6, in the phase shift mask 71 (image thereof), the light intensity distribution is largely lowered at the boundary area between the regions where the phases are mutually shifted by a half period. On the other hand, for the processing of a CGH, the patterning is performed by using three masks corresponding to the depths to be defined in respective regions, that is, a first mask having a reference depth, and a third mask having a depth triple the reference depth. By using these masks sequentially to repeatedly perform the patterning process and an etching process, a CGH of an eight-level shape can be produced.

Figure 7A:
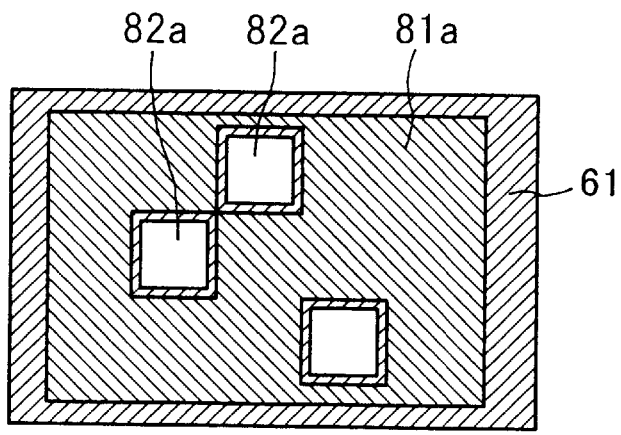
FIGS. 7A and 7B are schematic plan views, respectively, for explaining superposition of a resist pattern and a substrate.
Figure 7B:
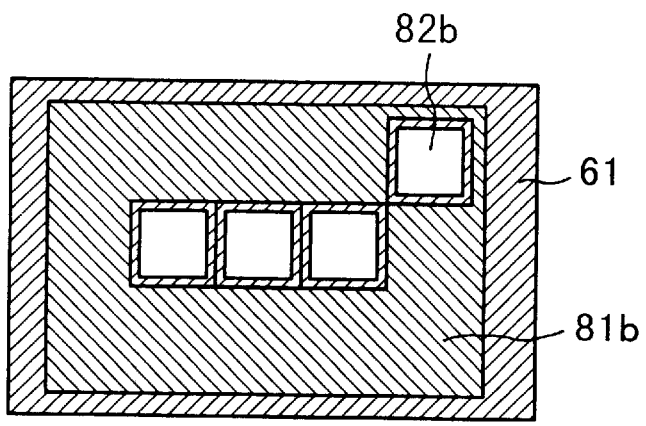

FIG. 7A shows the state in which a resist pattern 81*a* formed by using the first mask is superposed on the substrate of FIG. 4. The regions 82*a* as can be seen through windows in the resist pattern 81*a* are those regions to be processed by using the resist pattern 81*a*. Similarly, FIG. 7B shows the state in which a second resist pattern 81*b* is superposed on the substrate. The regions 82*b* as can be seen through windows in the resist pattern 81*b* are those regions to be processed by using the resist pattern 81*b*. The third mask is omitted from illustration since the process using it is similar to those of the first and second masks.

Figure 8:
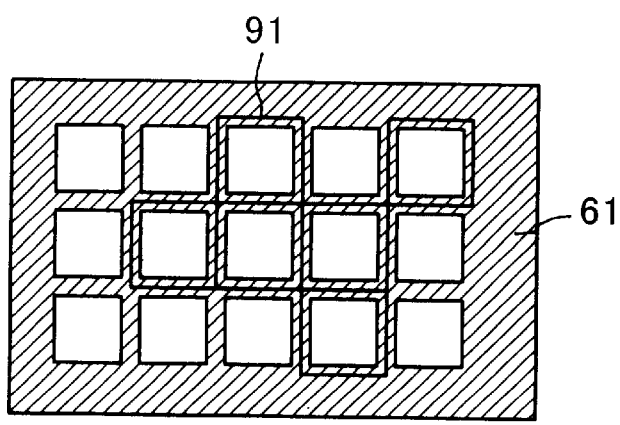
FIG. 8 is a schematic view for explaining a boundary of a resist pattern.
Figure 9A:
FIGS. 9A and 9B are schematic sectional views of diffractive optical elements.
Figure 9B:
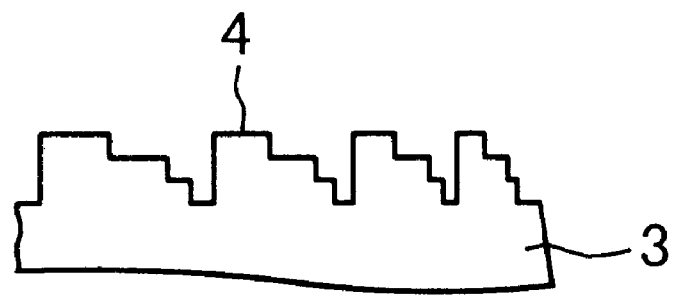
Figure 10:
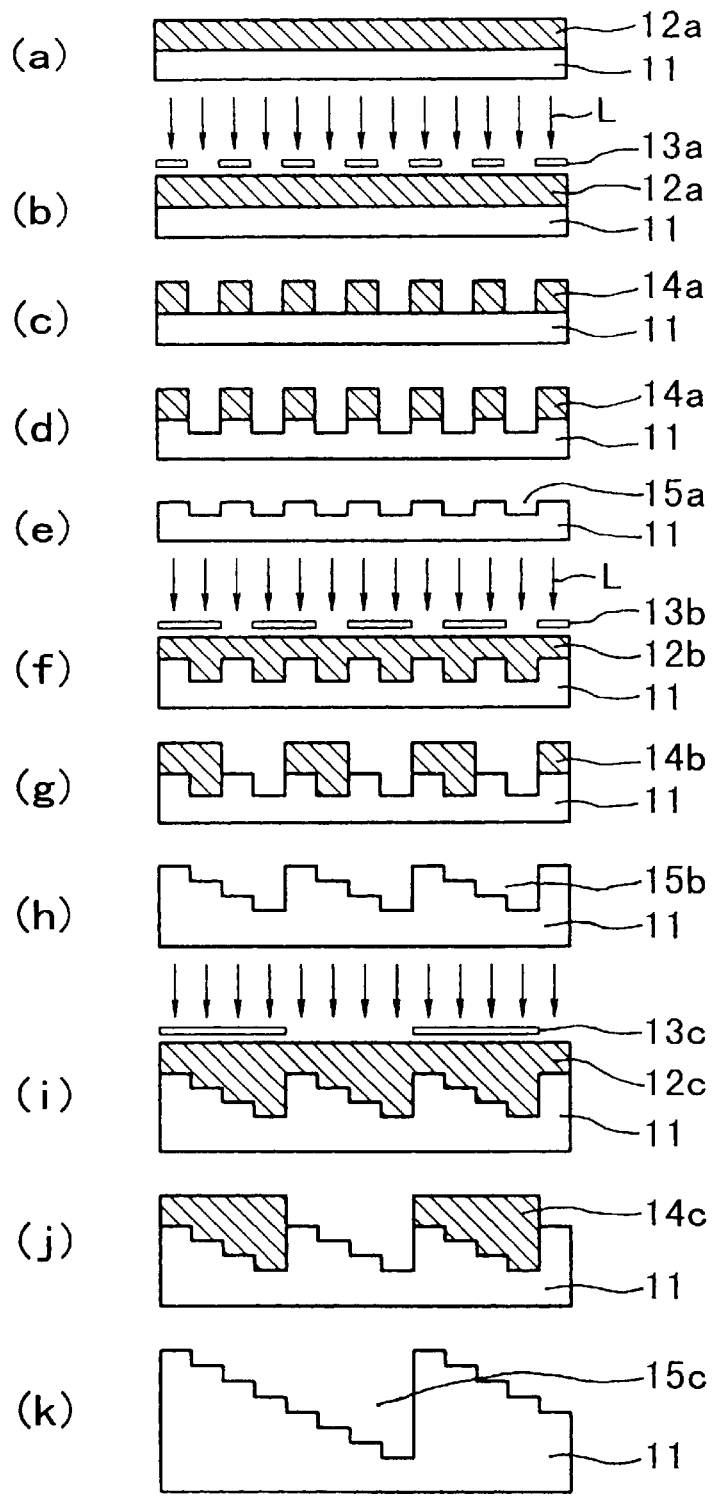
FIGS. 10((a)–(k)) is a schematic view for explaining an example of conventional production of a diffractive optical element.
Figure 11:
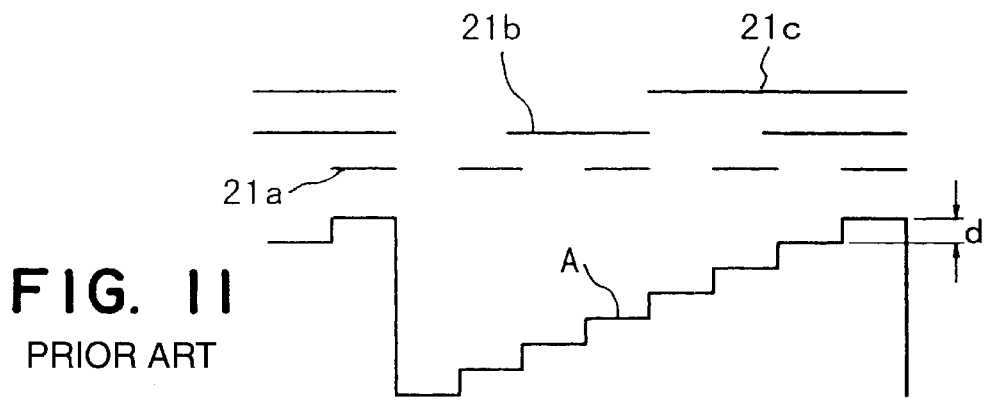
FIG. 11 is a schematic sectional view of a substrate and reticles.
Figure 12A:
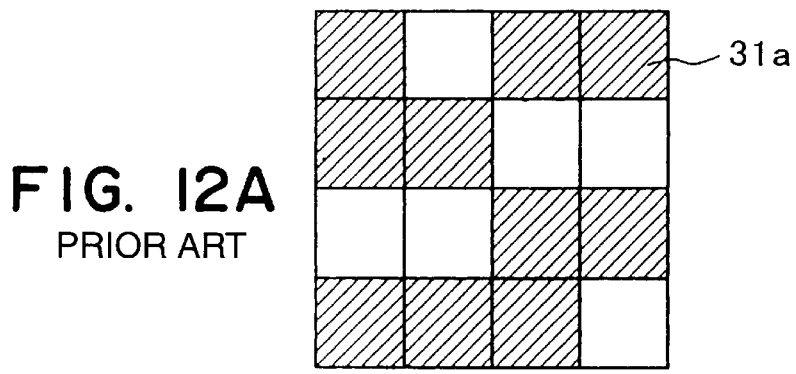
FIGS. 12A–12C are schematic plan views of reticles.
Figure 12B:
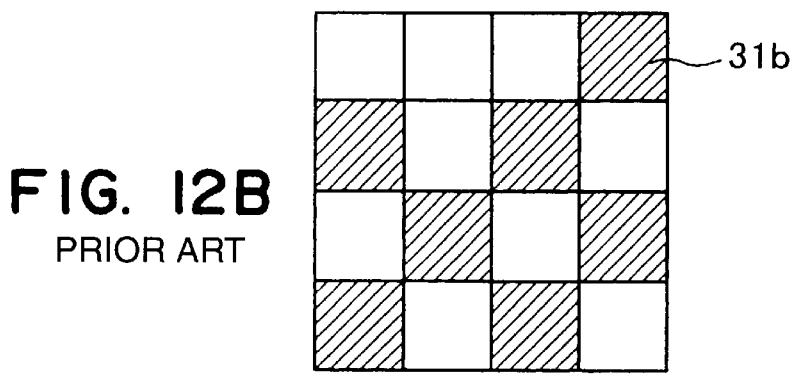
Figure 12C:
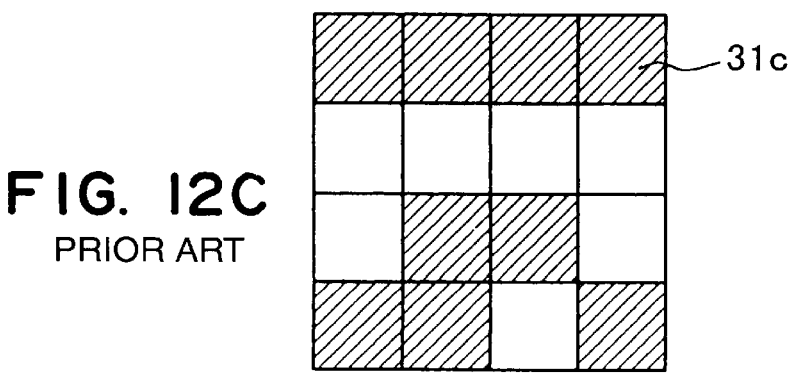
Figure 14:
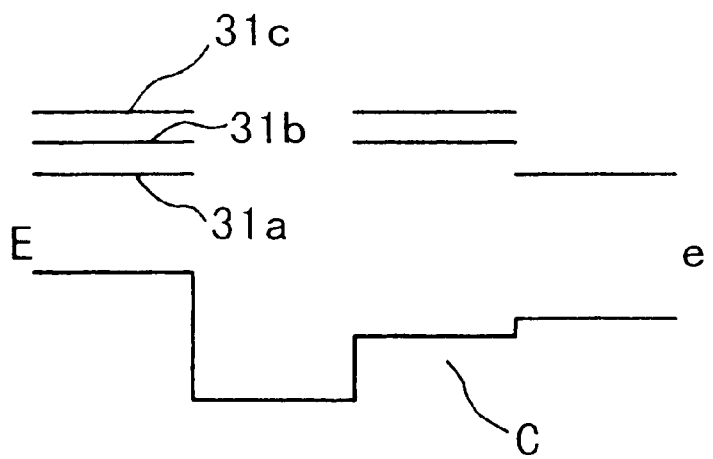
FIG. 14 is a schematic sectional view of a substrate and reticles.
Figure 15:
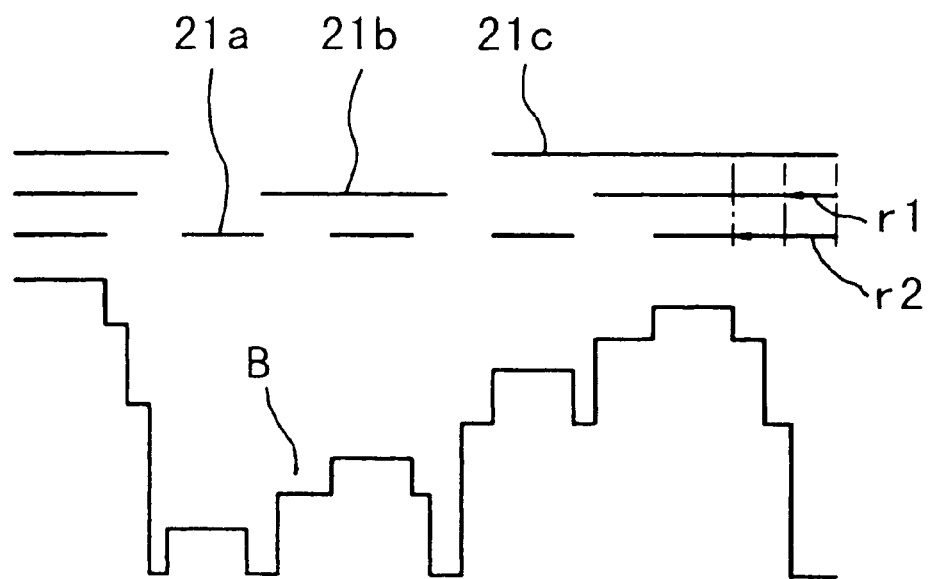
FIG. 15 is a schematic sectional view of a substrate and reticles.

FIG. 8 is a schematic view of a state in which the boundaries of the resist patterns 81*a* and 81*b* are superposed with each other. The position of the boundary 91 of the pattern as depicted by a solid line corresponds to the edge positions of the resist patterns, respectively, and the state of a largest alignment error is illustrated in the drawing. Thus, the boundaries of the resist patterns are not registered with each other. However, since the region in which the alignment error occurs is covered by the Cr film 61, there is no possibility that a very small groove structure is produced after the CGH processing through the etching process.

Further, an isotropic etching process similar to the wet etching process using hydrofluoric acid in the first embodiment, for example, may be performed to remove protrusions to be formed below the Cr film 61. Here, the position of the Cr film 61 may preferably be so determined that the edge thereof is registered with the boundary of the region just to be defined and so that the Cr film forming region 61 is included in a region, among juxtaposed regions, when the process amount is smaller. Further, the pattern edge of the mask pattern should be designed while taking the Cr film 61 as an offset applied thereto as a center.

The boundary for defining the Cr film may be selected in accordance with the difference in process amount between juxtaposed regions or any other condition such as the number of times of mask superpositions, for example. Thus, the Cr film 61 may be provided with priority, in accordance with those regions when the number of mask superpositions is large. Further, the Cr film 61 may be omitted in a region where edges are not superposed during the sequential processes.

The Cr film 61 formed in the unprocessed region may be provided with an anti-reflection film. On that occasion, when a produced CGH is incorporated into an optical system, it can serve to suppress the reflection of light from the boundary where the Cr film 61 is present. It is, therefore, effective to prevent flare light.

In place of the Cr film used in the first and second embodiments, a metal film such as Al, Ti, Ni, Mo or W may be used. With such a metal film, a diffractive optical element having a good effect of flare light prevention can be provided.

In the etching process to the substrate, for the removal of a structure resulting from the unprocessed region, which process is to be performed at the final stage of the production of the diffractive optical element, the material constituting the unprocessed region functions like the Cr film.

In the embodiments described above, if the light blocking film used causes reflection of light, a $CrO_2$ film may be used as an anti-reflection film. Further, in a case wherein reflection light rather than transmitted light causes inconveniences, the Cr film may be replaced by a light transmissive film such as $TiO_2$ or ITO, for example. Even when a material having an etching selectivity to the substrate is used, a diffractive optical element having a good effect of flare light suppression can be accomplished. Here, since the reflection light from the unprocessed region is small and also the light transmitted has a small distribution, no inconvenience is caused in relation to the unprocessed region. When the structure resulting from the etching of the substrate using the unprocessed region is removed by an isotropic etching process, which is to be performed at the final stage of the production of the diffractive optical element, the material constituting the unprocessed region functions like the Cr film.

Fluorite may be used for the substrate of a diffractive optical element, in place of quartz described above and, on that occasion, a diffractive optical element having a very good property, that is, a higher inside transmission factor, particularly, to the wavelengths of ArF excimer laser light (193 nm) and $F_2$ excimer laser light (157 nm) is provided. Also, for the etching process to fluorite, a wet etching process using water or nitric acid is suitable.

In the method of producing an optical element according to the embodiments described above, an unprocessed region is defined in a pattern. This effectively assures a desired shape even if an alignment error occurs due to deviations of masks used. Thus, degradation of the optical performance can be avoided effectively.

While the invention has been described with reference to the structures disclosed herein, it is not confined to the details set forth and this application is intended to cover such modifications or changes as may come within the purposes of the improvements or the scope of the following claims.

What is claimed is:

1. A method of producing an optical element having a multiple-level step-like structure, said method comprising:
    a first process for providing a first mask pattern at a position corresponding to a predetermined boundary among boundaries at steps of the multiple-level step-like structure of a substrate, the first mask pattern having a width narrower than that of a single step;
    a second process for providing a second mask pattern upon the substrate having the first mask pattern formed thereon, the second mask pattern having a width corresponding to a single step or plural steps of the multiple-level step-like structure;

a third process for processing the substrate by use of the first and second mask patterns and thereafter for removing the second mask pattern while leaving the first mask pattern there; and after repeating the second and third processes plural times of a predetermined number, removing the first mask pattern.

2. A method according to claim 1, wherein said third process comprises performing an isotropic etching process.

3. A method according to claim 2, wherein the substrate is made of one of fluorite and quartz.

4. A method according to claim 1, wherein the first mask pattern is formed so that the position of an edge thereof or a central position thereof coincides with the predetermined boundary.

5. A method according to claim 1, wherein the width of the first mask pattern is larger than an alignment precision of a lithographic apparatus to be used for the processing performed in said third process.

6. A method according to claim 1, wherein the first mask pattern is made of one of Cr, Al, Ti, Ni, W, CrO2, TiO2 and indium tin oxide.

* * * * *